May 3, 1927.    G. R. HOFFMAN    1,627,509
BRAKING MECHANISM, MORE PARTICULARLY FOR MOTOR VEHICLES
Filed May 29. 1926

INVENTOR
BY
ATTORNEY

Patented May 3, 1927.

1,627,509

UNITED STATES PATENT OFFICE.

GLENN R. HOFFMAN, OF SPRINGFIELD, ILLINOIS.

BRAKING MECHANISM, MORE PARTICULARLY FOR MOTOR VEHICLES.

Application filed May 29, 1926. Serial No. 112,652.

My invention relates to braking mechanism for vehicles, more especially for motor vehicles of the well-known Ford type. It has for its object to provide a construction by which the brake band of the "transmission" and the emergency wheel-brake of the Ford type of car can both be applied at the same time through actuation of the foot-pedal or lever of the transmission brake band, or the emergency wheel-brake alone may be applied through actuation of the usual emergency-brake lever. The invention also contemplates providing a floating lever for connecting the foot-lever power transmitting means and the emergency lever transmitting means one with the other and through a rod or link from such lever with the emergency wheel-brake of the Ford usual type of construction.

To the accomplishment of the foregoing and such other objects as may hereinafter appear, the invention consists in the features hereinafter particularly described and then sought to be clearly defined by the claims, reference being had to the accompanying drawing forming a part hereof and in which—

Figure 1:
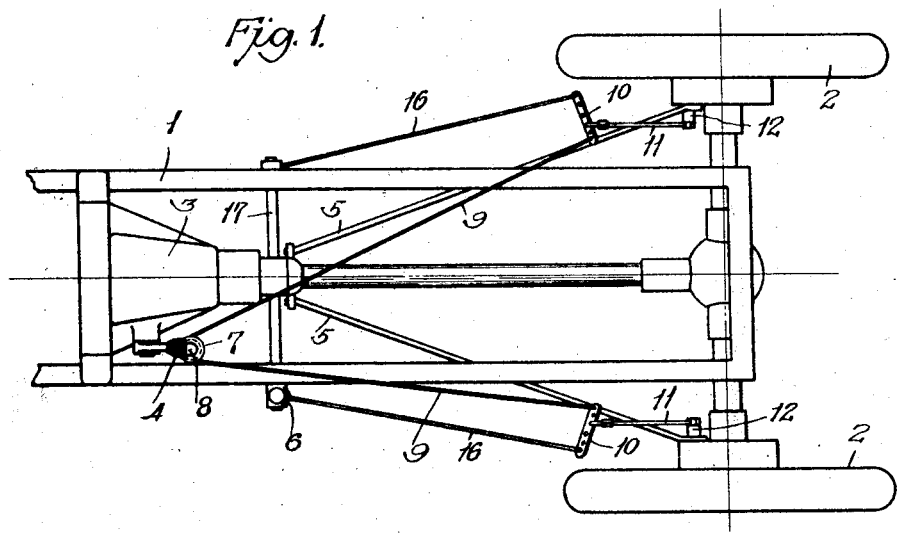
Figure 1 is a plan view, conventionally illustrated, of a Ford chassis, showing my invention applied.
Figure 2:
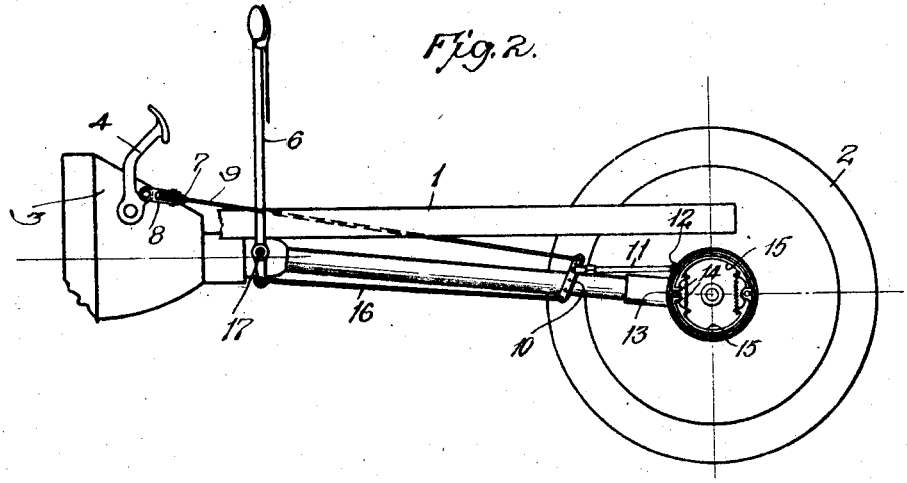
Figure 2 is a side elevation of the parts shown in Figure 1.

In the drawing the numeral 1 designates a Ford chassis; 2 the rear wheels to which the Ford type of emergency brakes are applied; 3 the transmission housing which contains the usual transmission including the brake-drum, the brake-band of which is actuated as usual through the foot-pedal or lever 4; 5 the radius rods, and 6 the emergency brake lever, all of which parts will be of the usual Ford construction, except as my present invention may modify the same. Under my invention I connect a sheave 7 and its block 8 to the foot-lever 4 of the usual brake-band of the brake-drum of the Ford transmission, and a cable 9 is passed around sheave 7 and its ends connected to the floating levers 10, at each side of the chassis, adjacent to the rear wheels 2, which levers are connected by rods or links 11 to the stub-shafts 12 of the emergency-brake cams 13 that fit between the adjacent ends 14 of brake-bands or shoes 15 of the well-known Ford construction, and therefore not necessary to illustrate in detail, so as to brake the rear wheels in an emergency. The floating levers 10 have attached to one end thereof the rods 16 the opposite ends of which are attached to the ends of the cam shaft 17 of the emergency brake-lever 6. Under such construction, the "transmission" brake will be applied, and at the same time the emergency brakes of the rear wheels 2 will be applied by the pull exerted on cable 9 when the transmission brake lever is pressed forward, and thus both brakes will be applied for the more efficient braking of the vehicle.

By actuating the emergency brake band lever 6 the pull on the rods 16 is exerted through levers 10 on the rods or links 11 so as to actuate the cams 13 and apply the emergency wheel-brakes, without applying or influencing the transmission brakes.

It will be observed that the levers 10 are pivotally connected to the ends of the rods or links 11, and by changing the points of attachment from one to another of the holes or perforations formed in the levers the throw or leverages of the levers may be adjusted, and also slack in the cable be taken up.

It will be observed that under the construction illustrated and described but slight changes are needed in the Ford standard construction to make it possible to obtain efficient braking action of the transmission brake and the emergency brakes at the same time by simply actuating the transmission brake lever, or if desired the emergency brakes alone may be actuated through movement of the emergency brake lever.

As the details of the transmission brake foot-lever and the emergency brake lever and brake shoes are well-known and only simple changes are required to apply my invention, details of the well-known parts are not illustrated.

I have described the preferred detail construction of the features of my invention but changes may be made therein without departing from the spirit of my invention.

Having described my invention and set forth its merits, what I claim is:—

1. A braking mechanism comprising a foot-lever operated "transmission" brake, an emergency wheel-brake, an emergency brake lever, a power transmitting cable leading from the foot-lever, a power transmitting rod leading from the emergency lever, a rocking lever connecting the foot-lever cable and emergency lever rod, and a link connection between the rocking lever and emergency brake, whereby on actuation of the foot-lever both the transmission and the emergency brakes are applied, and on actuation of the emergency lever the emergency brake, alone, is applied.

2. A braking mechanism comprising a lever operated "transmission" brake, emergency wheel-brakes, a cable connected with the "transmission" brake lever, an emergency brake lever and rods extending therefrom, levers connecting said rods with the adjacent ends of the cable leading from the transmission brake lever, and links connecting said connecting levers with the emergency wheel brakes, whereby on actuation of the "transmission" brake lever the transmission brake and both emergency wheel brakes will be applied and on actuation of the emergency lever the emergency wheel brakes, alone, will be applied.

In testimony whereof I affix my signature.

GLENN R. HOFFMAN.